Patented July 2, 1935

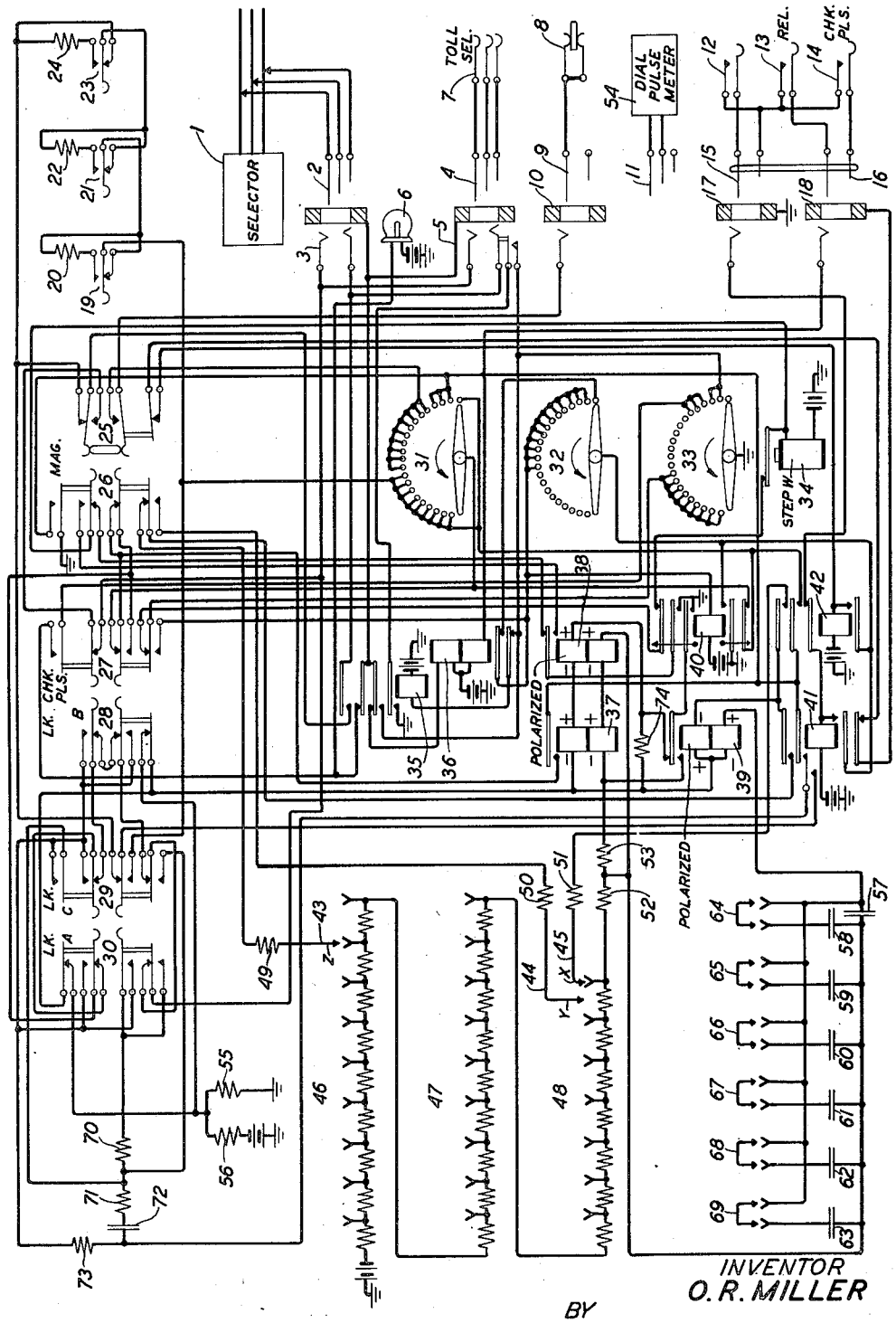

2,006,472

UNITED STATES PATENT OFFICE 2,006,472

TESTING SYSTEM

Ohmer R. Miller, Jackson Heights, N. Y., assignor to Bell Telephone Laboratories, Incorporated, New York, N. Y., a corporation of New York Application September 15, 1934, Serial No. 744,148

10 Claims. (Cl. 179—175.2)

This invention relates to improvements in test sets for use in testing automatic telephone systems.

Its object is to simplify and improve the equipments of a test set to secure accurate and reliable testing performances.

Heretofore test sets have been used in automatic telephone systems for testing the performance of step-by-step switches to determine the varying loop, leak and other electrical conditions under which a switch will function.

It is a feature of the present invention to provide in test sets of this kind a stepping switch for controlling the sending of the current impulses that actuate the switch under test in such a manner that a predetermined number of impulses are sent during a portion of the cycle of operation of said stepping switch.

It is another feature of the invention to provide a circuit arrangement in which two polarized relays and a third polarized relay are alternately operated with the speed of the alternate operation being controlled by the third relay and with one of the two relays producing through a pulsing circuit, current impulses to operate the stepping switch and the other relay producing through a pulsing circuit, current impulses for transmission to a switch under test.

Another feature is an arrangement of condensers and resistances in the circuit for these relays whereby the operation and release characteristics of the third relay are controlled to vary the rate at which the impulses are produced and to vary the relative open and closed periods of the pulses.

The invention will be more readily understood by reference to the drawing, which shows one embodiment arranged to test automatic switches. A set of three relays operate and release in a network involving inductance, resistance and capacity in such a way that by adjusting the capacity the speed of the operate and release cycle can be controlled while the percentage make and break can be adjusted to any predetermined value by varying the resistance element of the network.

The pulses produced by one of the relays are used to advance a rotary switch whose function is to transfer the pulsing leads of the switch under test to the contacts of a second one of the timed relays for a length of time sufficient to send exactly nine full pulses to the switch under test. Keys are provided such that when operated will change the loop and leak conditions so that the most severe conditions found in practice may be duplicated at will.

The test set is arranged to test the pulsing circuits of both local and toll selectors as well as their stepping magnets and facilities are provided so that the pulse speed and the percentage make and break can be conveniently measured.

The invention will now be described in detail with reference to the drawing.

Testing pulsing speed of the test set

To test the pulsing speed of the test set plugs 10, 15 and 16 connected to control keys 12, 13 and 14 are inserted in jacks 17 and 18 respectively and keys 14 and 27 are operated. The operation of key 14 causes the operation of relay 42 in a circuit traced from ground on the sleeve terminal of jack 17, sleeve conductor of plug 15, the contacts of key 14, sleeve conductor of plug 16 and jack 18, lower outer back contact of relay 41, lower outer back contact of key 25 to battery through the winding of relay 42. The operation of relay 42 causes the operation of relay 40 in a circuit traced from ground on the sleeve terminal of jack 17, sleeve conductor of plug 15, the contacts of key 14, sleeve conductor of plug 16 and jack 18, lower outer back contact of relay 41, lower outer back contact of key 25, lower front contact of relay 42, wiper and terminal No. 1 of arc 32, lower inner back contact of relay 36 to battery through the winding of relay 40. Relay 40, operated, locks itself and relay 42 operated through the first 13 terminals of the switch, connects ground to the armature of polarized relay 39, starting the relay combination comprising relays 39, 38 and 37 oscillating and producing pulses and connects ground to the armature of relay 38 so that the operating and releasing of relay 38 will operate and release switch magnet 34 and advance the switch. The locking path for relay 42 is traced from ground on the lower inner contact of relay 40 to battery through the lower front contacts and winding of relay 42. The locking path for relay 40 is traced from ground on the lower inner contact of relay 40, brush and terminal No. 1 of arc 32, lower inner back contact of relay 36 to battery through the winding of relay 40. In positions 2 to 13, inclusive, of the switch this locking path is traced from ground through the lower inner front contact of relay 40, wiper and terminals No. 2 to 13, inclusive, of arc 32 to battery through the winding of relay 40. In positions 14 to 22, inclusive, relay 40 is also maintained operated in a path traced from ground on the wiper of arc 33, terminals 14 to 22, inclusive, of arc 33 lower outer front contact of key 27 to battery through the winding of relay 40. In this manner relay 40 remains operated and the switch rotates under control of pulsing relay 38, in a manner to be described later, until release key 13 is operated.

As previously mentioned the operation of relay 40 places ground on the armature of relay 39 causing relays 39, 38 and 37 to oscillate. This is accomplished in the following manner: When ground is placed on the armature of relay 39, relays 37 and 38 operate immediately in a path traced from battery through resistance 56 through the lower outer back contact of key 28 through the upper windings of relays 37 and 38 in series to ground through the back contact of relay 39 and the upper inner front contact of relay 40. In this condition resistances 55 and 74 are in parallel with the windings of relays 37 and 38. The placing of ground on the armature of relay 39 also closes a circuit through both windings of relay 39. The circuit through the upper winding of relay 39 is traced from ground through the upper inner front contact of relay 40, back contact of relay 39, resistance 74, upper winding of relay 39, upper outer front contact of relay 42 to battery through resistance 51, conductor 45 and variable resistances 48, 47 and 46 in series. The circuit for the lower winding of relay 39 is traced from ground through the upper, inner front contact of relay 40, back contact of relay 39, resistance 74, lower winding of relay 39 through whichever of condensers 57, 58, 59, 60, 61, 62 and 63 may be connected in circuit by means of straps 64, 65, 66, 67, 68 and 69 to battery through resistances 52, 48, 47 and 46 in series. The current in the upper winding of relay 39 which is completed through the resistance path is in a direction to operate relay 39 while the current through the lower winding of relay 39 which is completed through the capacity path is in a direction to oppose the operation. Due to the time constant of the circuit through the lower winding of relay 39 the current is of comparatively large value when the circuit is first closed and effectively prevents the operation of the relay on its upper winding. However, the current through the lower winding is gradually reduced as condensers 57, 58, 59, 60, 61, 62 and 63 become charged and at an interval of time after the first closure of the circuits the current in the lower winding of relay 39 is no longer sufficient to prevent its operation on its upper winding and relay 39 operates. Since the time constant of the circuit through the lower winding controls the time of operation of relay 39, the operating interval can be altered and adjusted to the desired value by adding or subtracting condensers 58, 59, 60, 61, 62 and 63 from the circuit by means of straps 64, 65, 66, 67, 68 and 69.

Relay 39 operated, breaks the circuit through the upper windings of relays 37 and 38 and closes a circuit through the lower windings of relays 37 and 38. This circuit is traced from ground on the upper, inner front contact of relay 40, front contact of relay 39, the lower windings of relays 37 and 38 in series, with resistance 53 in parallel with both windings to battery through resistances 52, 48, 47 and 46. The lower windings of relays 37 and 38 are poled so that the circuit just described acts to overpower the magnetic flux remaining in the cores from the operation on their upper windings and causes the armatures of these relays to speedily leave their front contacts and make contact with their back contacts and remain in that position as long as the circuits through their lower windings remain closed. The operation of relay 39 also changes the direction of current through both of its own windings. The path of the current which traverses the upper winding of relay 39 under this condition is traced from ground on the upper inner contact of relay 40, front contact of relay 39, resistance 53, resistance 52, conductor 45, resistance 51, upper outer front contact of relay 42, upper winding of relay 39, lower outer back contact of key 28 to battery through resistance 56, resistance 55, being connected in parallel with the upper winding of relay 39 and resistances 51, 52 and 53. The circuit for the lower winding of relay 39 is traced from ground on the upper inner front contact of relay 40, front contact of relay 39, resistance 53, whichever of condensers 57, 58, 59, 60, 61, 62 and 63 are connected in circuit by straps 64, 65, 66, 67, 68 and 69, lower winding of relay 39, lower outer back contact of key 28 to battery through resistance 56, resistance 55 being in parallel with the lower winding of relay 39, condensers 57, 58, 59, 60, 61, 62, 63 which may be in circuit and resistance 53 to ground.

The direction of current through both windings of relay 39 in the paths just described is in the opposite direction from the paths for the winding of this relay previously described and have the opposite effect. The current in the upper winding of relay 39 is in a direction to place the armature on its back contact but is opposed by the flux set up in the lower winding. As in the previous instance this latter flux is of large value when the circuit is first closed but is gradually reduced as the condensers in circuit are discharged and recharged in the opposite direction. After a time interval the flux in the lower winding is insufficient to prevent the flux from the upper winding from placing the armature on its back contact and this occurs. With the armature of relay 39 on its back contact the circuit first described is again closed and after a time interval relay 39 operates again. In this manner relay 39 operates and releases, and operates and releases relays 37 and 38 at a frequency determined by the number of condensers connected in the circuit.

Relays 39, 37 and 38 thus act as an oscillator producing circuit closures of known frequency and by adjusting the amount of capacity in series with the lower winding of relay 39 the period of oscillation can be made the same as that produced by a subscriber's dial.

Upon the first release of relay 38 after the operation of relay 40, ground from the upper middle front contact of relay 40, through the back contact of relay 38, upper inner back contact of key 26, is connected to battery through the winding of stepping magnet 34 operating magnet 34. This circuit is broken upon the next operation of relay 38 and when magnet 34 releases the wipers on arcs 31, 32 and 33 are advanced from the first or normal position to the second terminal. When relay 38 again releases magnet 34 is again operated and when relay 38 again operates the switch is advanced to the next terminal. In this manner the switch progresses over its terminals at the speed of operation of the oscillating relays 39, 37 and 38 as long as relay 40 remains operated.

On passing terminals 4, 5, and 6 of each revolution of the switch ground through wiper and terminals Nos. 4, 5 and 6 of arc 33, through the upper front contacts of key 27 is connected to battery through the filament of lamps 6 lighting the lamp. Lamp 6 therefore flashes each revolution of the switch and the pulsing speed of relays 39, 37 and 38 can be checked by any convenient means. One method of checking the speed of pulsing which has been found advantageous is to note the number of flashes of the lamp in an interval of time measured with a watch in which case the pulses per second equal the number of flashes counted times 22 divided by the elapsed time in seconds.

When the pulsing speed has been adjusted and checked, key 13 is operated. The operation of this key causes the operation of relay 36 in a path traced from ground on the sleeve of jack 17, sleeve terminal of plug 15, the contacts of key 13, tip terminal of plug 16 and jack 18 to battery through the lower winding of relay 36. With relay 36 operated the locking path for relay 40 in position 1 of the switch as previously described is opened and relays 40 and 42 are released when the switch reaches position 1.

*Adjusting the percentage make and break*

To adjust the percentage make and break a dial pulse meter, shown schematically as 54 on the drawing, is connected to jack 5 by means of plug 11. The dial pulse meter may be of the type well known in the art which shows on a scale the percentages of time that the circuit is open and closed during the time that pulses are transmitted to it. Provision is made for adjusting the percentage make and break for both the loop and leak tests, to be described later, by operating key 14 and adjusting the position of conductor 45 on resistances 48, 47 and 46 for the loop test and by operating key 12 and adjusting the position of conductor 43 on resistances 48, 47 and 46 for the leak test.

Let it be assumed that it is desired to adjust the percentage make and break for the loop test, that plug 11, connected to dial pulse meter 54, has been inserted in jack 5 and that keys 14 and 27 have been operated. The operation of keys 14 and 27 cause relays 40 and 42 to operate and lock and start relays 39, 37 and 38 oscillating and the switch rotating as previously described. As the wiper associated with arc 33 passes terminals 2 and 3, ground on the wiper brush through terminals 2 and 3 of arc 33 through the lower outer back contact of relay 36 is connected to battery through the winding of relay 35, operating relay 35. Relay 35 locks through its own contacts in a circuit traced from ground on the upper inner front contact of relay 35, contacts of jack 5 which are closed because plug 11 is inserted in jack 5, lower outer back contact of relay 36 to battery through the winding of relay 35. Relay 35, operated, closes a circuit from the pulsing contacts of relay 37 to the dial pulse meter. This circuit is traced from ground in the dial pulse meter, tip conductor of plug 11, tip spring of jack 5, lower outer back contact of key 30, lower outer back contact of key 29, lower inner back contact of key 28, upper back contact of key 28, upper inner back contact of key 29, upper inner back contact of key 30, lower inner back contact of key 26, pulsing contacts of relay 37, upper middle front contact of relay 42, back contacts of keys 19, 21 and 23, upper front contact of key 25, uppermost front contact of relay 35 to battery in the dial pulse meter through ring spring of jack 5 and ring conductor of plug 11.

The switch revolves continuously as described previously and continuous pulses are transmitted from the contacts of pulsing relay 37 until release key 13 is operated. The percentage make and break of the pulses may be determined from the reading of the dial pulse meter and the desired value obtained by adjusting the point where conductor 45 is attached to resistances 46, 47 and 48.

To adjust the percentage make and break under the leak condition key 12 and key 27 are operated. In this case conductor 43 is connected to the point on resistances 46, 47 and 48 which gives the desired reading on the dial pulse meter. The pulsing circuit is the same as that described for the loop checking test except that relay 41 is operated through the operation of key 12 instead of relay 42. In this case the operation of key 12 connects ground from the sleeve of jack 17 through the sleeve conductor of plug 15, contacts of key 12, tip conductor of plug 15, tip spring of jack 17, upper inner back contact of relay 42 to battery through the winding of relay 41. The operation of relay 41 connects ground from the sleeve of jack 17 through sleeve conductor of plug 15, contacts of key 12, tip conductor of plug 15, tip spring of jack 17, upper inner back contact of relay 42, lower inner front contact of relay 41, wiper and terminal No. 1 of arc 32, lower inner back contact of relay 36 to battery through the winding of relay 40. Relay 40 operates over the circuit just traced and locks, starts pulsing relays 39, 37 and 38, oscillating, and the switch rotating as previously described.

With the test set adjusted for speed of pulsing and for percentage make and break for the various conditions, it is ready for the purpose of testing selectors. If the selector to be tested is a local selector, jack 3 and plug 2 are used and the cord attached to plug 2 is connected to the tip, ring, and sleeve of the selector. The selector has been indicated by box 1 in the drawing and may be of any well known automatic switch type.

*Loop test of local selector*

The drawing shows arrangements for testing the selector on various lengths of loop and for this purpose keys 19, 21 and 23 are provided which, when operated in various combinations, provide seven different lengths of loop. Of course, more keys could easily be provided if it were found to be desirable to test the selector on more loop lengths than provided by the three keys shown on the drawing. Let it be assumed that the selector is to be tested under the loop condition provided by the operation of all three keys and that keys 19, 21 and 23 are consequently operated.

Provision is made so that the test set will not cause interference if it should be inadvertently connected to a busy selector. Should the test set be connected to a busy selector, ground on the sleeve terminal of the selector is connected to the sleeve conductor of plug 2 and sleeve spring of jack 3 and through the second armature and back contact of relay 35 to battery through the upper winding of relay 36. Relay 36 operates in this circuit and opens the operating path of relay 40 and renders the operation of keys 12 and 13 ineffective until the selector becomes idle.

When the test set is connected to an idle selector and key 14 is operated for the loop test relays 42 and 40 are operated and locked as previously described. The operation of relay 40 starts pulsing relays 39, 37 and 38 oscillating and the pulses from the contacts of relay 38 advance the switch as before.

When the switch reaches position 2 a circuit is closed to operate relay 35. This circuit is traced from ground on the wiper and terminal No. 2 of arc 33, lower outer back contact of relay 36 to the battery through the winding of relay 35. The operation of relay 35 closes the loop circuit to the selector. This loop circuit is traced from ground on the tip of selector 1, tip conductor of plug 2, tip spring of jack 3 lower outer back contact of key 30 lower outer back contact of key 29, lower inner back contact of key 28, upper inner back contact of key 28, upper inner back contact of key 29, upper inner back contact of key 30, lower inner back contact of key 26, lower inner back contact of key 27, wiper and terminal No. 2 of arc 31, upper middle front contact of relay 42, front contacts of key 19, resistance 20, front contacts of key 21, resistance 22, front contacts of key 23, resistance 24, upper front contact of key 25, uppermost front contact of relay 35, ring spring of jack 3, ring conductor of plug 2 to battery on the ring conductor of selector 1.

The loop circuit remains closed over the path just traced until the switch leaves position 4, whereupon the loop circuit is modified so that the pulsing contacts of relay 37 are not short-circuited by arc 31 but are effective in advancing the selector under test. This circuit is traced from ground on the tip of selector 1, tip conductor of plug 2, tip spring of jack 3, through the contacts of keys 30, 29, 28, 29, 30, 26, hereinbefore traced, through pulsing contacts of relay 37, upper middle front contact of relay 42, contacts of key 19, resistance 20, front contacts of key 21, resistance 22, contacts of key 23, resistance 24, upper back contacts of key 25, uppermost front contact of relay 35, ring spring of jack 3, ring conductor of plug 2 to battery on the ring conductor of selector 1. The switch again short-circuits the contacts of relay 37 when it arrives at position 14, having allowed 9 full pulses to be transmitted to the switch under test. In position 14, the locking circuit to relays 40 and 42 is broken and these relays release and the switch is returned to the normal or No. 1 position by self interruptions. The path for returning the switch to normal is traced from ground on the wiper and contacts 14 to 22, inclusive, of arc 33, lower outer back contact of key 27, upper outer back contact of relay 40 to battery through the back contact and winding of magnet 34. The selector under test is released by the operation of key 13 which operates relay 36 as previously described. The operation of relay 36 breaks the locking circuit to relay 35 allowing it to release and open the loop circuit, at the uppermost front contact of relay 35. The opening of the loop circuit allows the selector to return to normal in readiness for further testing.

Leak test of local selector

Keys 30, 28 and 29 are provided to test the selector for various combinations of loop and leak. When key 30 is operated, the loop circuit is altered so that resistance 73 is placed across the pulsing contacts of relay 37 in parallel with condenser 72 and resistances 71 and 70 in series. If key 28 is operated, resistance 73 only is placed across the pulsing contacts of relay 37. The operation of key 29 places resistance 73 across the pulsing contacts of relay 37 in parallel with condenser 72 and resistance 71.

The leak test is made in the same manner as has been described for the loop test except that key 12 is operated instead of key 14 to initiate a train of 9 pulses and key 30, 28 or 29 is also operated to apply the desired leak condition. The operation of key 12 operates relay 41 as previously described and relay 41 operates relay 40 which in turn starts pulsing relays 39, 37 and 38 oscillating and causes the switch to advance as before. Nine pulses are transmitted to the selector and the selector released as previously described.

Test of toll selector

To test a toll selector or any selector which does not return ground on the sleeve, attachment plug 7, which connects to the tip, ring and sleeve of the toll selector is used. Attachment plug 7 is connected to plug 4 associated with jack 5. In this case when relay 35 operates through terminals 2 and 3 as described previously, relay 35 locks in a circuit traced from ground on the upper inner front contact of relay 35, contacts of jack 5 which are operated due to the presence of plug 4, lower outer back contact of relay 36 to battery through the winding of relay 35. Relay 35 is released by the operation of key 13 as previously described.

Test of selector magnet

The circuit is also arranged to test the correct functioning of the stepping magnet in the selector and in order to make this test key 25 which is normally operated is released and key 26 is operated. Connection is made to the magnet in the selector by attaching tool 8 to the magnet winding and inserting plug 9 in jack 10. The release of key 25 and the operation of key 26 alters the pulsing circuit so that grounded pulses are sent to the selector magnet. Upon the operation of key 12 ground from the sleeve conductor of jack 17 operates relay 41 as previously described and the operation of relay 41 causes the operation of relay 40 which starts pulsing relays 39, 37 and 38 oscillating and the switch to make a complete revolution as before. In this case, however, the switch sends out nine grounded pulses while passing from positions 5 to 13, inclusive. The pulsing path is traced from ground on the upper outer front contacts of key 26, contacts of pulsing relay 37, lower inner back contacts of key 27, wiper and terminals 5 to 13, inclusive, of arc 31, lower inner front contacts of key 25, tip spring of jack 10, tip conductor of plug 9, attachment plug 8 to battery through the winding of the stepping magnet of the switch under test.

The percentage make and break for this test may be adjusted in a similar manner to that described previously for the loop and leak tests by releasing key 25, operating key 26, and operating keys 27 and 12, inserting plug 11 in jack 5 and arranging the dial pulse meter to accept grounded pulses. The circuit under this condition is traced from ground on the upper outer front contacts of key 26, pulsing contacts of relay 37, lower inner front contacts of key 27, upper inner back contacts of key 30, upper inner back contacts of key 29, upper back contacts of key 28, lower inner back contacts of key 28, lower outer back contacts of key 29, lower outer back contacts of key 30, tip spring of jack 5, tip conductor of plug 11 to battery in dial pulse meter 54. The percentage make and break of the grounded pulses is read from dial pulse meter 54 and adjustment is accomplished by varying the connection of conductor 44 with respect to the taps on resistances 46, 47 and 48.

What is claimed is:

1. In a system for testing automatic switches, a pulsing circuit, a stepping switch, means for producing impulses in said pulsing circuit and for actuating said switch, and means controlled by said stepping switch for rendering said pulsing circuit ineffective for certain portions of the cycle of operations of said stepping switch.

2. In a system for testing automatic switches, a pulsing circuit, a stepping switch, means for producing impulses in said pulsing circuit and for actuating said switch, and means controlled by said switch for each cycle of operations for shunting the pulsing circuit for a certain period at the beginning of the actuation of the switch for thereafter enabling the pulsing circuit for a definite period and for again shunting the pulsing circuit until the completion of the cycle of operations of said switch.

3. In a system for testing automatic switches, a pulsing circuit, a stepping switch, means for producing impulses in said pulsing circuit at varying rates and for actuating said switch at said varying rates, and means controlled by said stepping switch for short-circuiting said pulsing circuit for certain portions of the cycle of operations of said stepping switch.

4. In a system for testing automatic switches, a pulsing circuit, a stepping switch, means for producing impulses in said pulsing circuit at varying percentages of open and closed periods of the pulses and for actuating said switch, and means controlled by said stepping switch for short-circuiting said pulsing circuit for certain portions of the cycle of operations of said stepping switch.

5. In a system for testing automatic switches, a pulsing circuit, a stepping switch, means for producing impulses in said pulsing circuit at varying rates and varying percentages of open and closed periods of said pulses and for actuating said switch, and means controlled by said stepping switch for short-circuiting said pulsing circuit for certain portions of the cycle of operations of said stepping switch.

6. In a testing system, an automatic switch, a pulsing circuit for actuating said automatic switch, a stepping switch, means for producing impulses in said pulsing circuit and for actuating said stepping switch, means for starting said impulse producing means, and means controlled by said stepping switch for controlling said pulsing circuit to transmit impulses to the automatic switch under test for only a portion of the cycle of operations of said stepping switch.

7. In a testing system, an automatic switch, a pulsing circuit for actuating said automatic switch, a stepping switch, means for producing impulses in said pulsing circuit and for actuating said stepping switch, means controlled by said stepping switch for short-circuiting said pulsing circuit for a preliminary portion of the operation of said stepping switch for thereafter eliminating said short circuit from the pulsing circuit for a succeeding portion of the operation of said stepping switch to permit said pulsing circuit to actuate said automatic switch and for thereafter again short-circuiting the pulsing circuit for the remaining portion of the operation of said stepping switch.

8. An impulse producing system comprising three polarized relays having two windings each, a ground connection, a circuit for said relays, a source of current, resistances and condensers in said circuit, means for establishing a connection between said circuit and said ground connection, said circuit being so connected to said relays, resistances, source of current and condensers that when said relays are in non-operated condition and the ground connection is made, two of said relays are immediately operated and the other relay operated a certain interval thereafter and when said other relay is operated, said two relays are immediately released and said other relay released a certain interval thereafter and so that said operation and release of said relays are repeated in this sequence as long as said ground connection remains, and pulsing circuits controlled by said two relays.

9. In a testing system, an automatic switch, an impulse producing system comprising three polarized relays having two windings each, a ground connection, a circuit for said relays, a source of current and condensers in said circuit, means for establishing a connection between said circuit and said ground connection, said circuit being so connected to said relays, resistances, source of current and condensers that when said relays are in non-operated condition and the ground connection is made, two of said relays are immediately operated and the other relay operates a certain interval thereafter, and when said other relay is operated said two relays are immediately released and said other relay released a certain interval so that said operation and release of said relays are repeated in this sequence as long as said ground connection remains, a pulsing circuit controlled by one of said three relays, another pulsing circuit controlled by another of said three relays, a stepping switch controlled by said second pulsing circuit, means controlled by said stepping switch for controlling the impulse transmission by said first pulsing circuit so that impulses are transmitted to the automatic switch for an intermediate portion of the cycle of operation of said stepping switch.

10. An impulse producing system comprising three polarized relays having two windings each, a ground connection, a circuit for said relays, a source of current, variable resistances in said circuit, variable condensers in said circuit, means for establishing a connection between said circuit and said ground connection, said circuit being so connected to said relays, resistances, source of current and condensers that when said relays are in non-operated condition and the ground connection is made, two of said relays are immediately operated and the other relay operated a certain interval thereafter, and when said other relay is operated said two relays are immediately released and said other relay released a certain interval thereafter, so that said operation and release of said relays are repeated in this sequence as long as the ground connection remains, means for varying said resistances and said condensers to vary the said certain intervals of operation and release of said other relay after the operation and release of said two relays, and pulsing circuits controlled by said two relays.

OHMER R. MILLER.